(12) United States Patent
Longenecker et al.

(10) Patent No.: US 8,100,429 B2
(45) Date of Patent: Jan. 24, 2012

(54) THREE DIMENSIONAL FOLDING STROLLER WITH INFANT CARRIER ATTACHMENT AND ONE HAND ACTUATED SEAT RECLINE

(75) Inventors: Michael L. Longenecker, Lancaster, PA (US); Jeff G. Greger, Lititz, PA (US)

(73) Assignee: Artsana USA, Inc., Lancaster, PA (US)

( * ) Notice: Subject to any disclaimer, the term of this patent is extended or adjusted under 35 U.S.C. 154(b) by 473 days.

(21) Appl. No.: 12/059,591

(22) Filed: Mar. 31, 2008

(65) Prior Publication Data
US 2009/0243260 A1 Oct. 1, 2009

(51) Int. Cl.
*B62B 3/02* (2006.01)
*B62B 7/00* (2006.01)
*B62B 9/00* (2006.01)

(52) U.S. Cl. ........ 280/642; 280/646; 280/647; 280/650; 280/658; 280/47.38; 280/47.4

(58) Field of Classification Search .................. 280/639, 280/642, 643, 644, 646, 647, 648, 650, 657, 280/658, 47.25, 47.34, 47.38, 47.4
See application file for complete search history.

(56) References Cited

U.S. PATENT DOCUMENTS

| | | | |
|---|---|---|---|
| 1,598,778 A | 5/1923 | Leake | |
| 1,709,527 A | 4/1929 | Ford | |
| 2,616,719 A | 11/1952 | Heideman | |
| 2,783,053 A | 2/1957 | Sheldrick et al. | |
| 3,112,042 A | 11/1963 | Leshner | |
| 3,168,330 A | 2/1965 | Smith et al. | |
| 3,227,484 A | 1/1966 | Merclean | |
| 3,390,893 A | 7/1968 | MacLaren | |
| 3,459,435 A * | 8/1969 | Garner | 280/644 |
| 3,504,926 A | 4/1970 | Glaser | |
| 3,556,546 A | 1/1971 | Garner | |
| 3,561,787 A | 2/1971 | Toda et al. | |
| 3,653,681 A | 4/1972 | Virtue | |
| 3,799,567 A | 3/1974 | Toda | |
| 3,989,295 A | 11/1976 | Sparkes | |
| 4,007,947 A | 2/1977 | Perego | |
| 4,023,825 A | 5/1977 | Kassai | |
| 4,046,401 A | 9/1977 | Kassai | |
| 4,111,454 A | 9/1978 | Kassai | |
| 4,126,331 A | 11/1978 | Sloan et al. | |
| 4,191,397 A | 3/1980 | Kassai | |
| 4,232,897 A | 11/1980 | Maclaren et al. | |

(Continued)

FOREIGN PATENT DOCUMENTS

BE 818905 12/1974

(Continued)

OTHER PUBLICATIONS

Evenflo® Easy Comfort Premier™ Stroller (1999).

(Continued)

*Primary Examiner* — John R Olszewski
(74) *Attorney, Agent, or Firm* — Volpe and Koenig P.C.

(57) ABSTRACT

A three-dimensional folding stroller featuring movable infant carrier mounts for securing an infant carrier to the stroller. The infant carrier mounts move between a first position, where the infant carrier may be secured to the stroller, and a second position that facilitates folding. The stroller also features a reclinable seatback support that is operable by one hand.

14 Claims, 10 Drawing Sheets

U.S. PATENT DOCUMENTS

| | | | |
|---|---|---|---|
| 4,248,443 A | 2/1981 | Ohlson | |
| 4,317,581 A | 3/1982 | Kassai | |
| 4,322,093 A | 3/1982 | Otto | |
| 4,335,900 A | 6/1982 | Fleischer | |
| 4,362,315 A | 12/1982 | Kassai | |
| 4,365,819 A | 12/1982 | Bart | |
| 4,378,946 A | 4/1983 | Voytko et al. | |
| 4,412,688 A | 11/1983 | Giordani | |
| 4,415,180 A | 11/1983 | Payne, Jr. | |
| 4,513,974 A | 4/1985 | Lin | |
| 4,542,915 A | 9/1985 | Wheeler, III et al. | |
| 4,564,212 A | 1/1986 | Orlandino et al. | |
| 4,591,176 A | 5/1986 | Kassai | |
| 4,602,395 A | 7/1986 | Kassai | |
| 4,606,550 A | 8/1986 | Cone | |
| 4,610,460 A | 9/1986 | Kassai | |
| 4,632,420 A | 12/1986 | Miyagi | |
| 4,632,421 A | 12/1986 | Shamie | |
| 4,660,850 A | 4/1987 | Nakao et al. | |
| 4,706,986 A | 11/1987 | Kassai | |
| 4,733,882 A | 3/1988 | Kassai | |
| 4,741,056 A | 5/1988 | Kassai | |
| 4,741,551 A | 5/1988 | Perego | |
| 4,763,911 A | 8/1988 | Gebhard et al. | |
| 4,763,919 A | 8/1988 | Nakao et al. | |
| 4,768,795 A | 9/1988 | Mar | |
| 4,770,437 A | 9/1988 | Glaser | |
| 4,805,928 A * | 2/1989 | Nakao et al. | 280/642 |
| 4,807,928 A | 2/1989 | Cone | |
| 4,817,982 A | 4/1989 | Kassai | |
| 4,819,958 A | 4/1989 | Perego | |
| 4,832,361 A | 5/1989 | Nakao et al. | |
| 4,856,809 A | 8/1989 | Kohus et al. | |
| 4,886,289 A | 12/1989 | Yee et al. | |
| 4,892,327 A | 1/1990 | Cabagnero | |
| 4,906,017 A | 3/1990 | Kassai | |
| 4,907,818 A | 3/1990 | Chai | |
| 4,924,725 A | 5/1990 | Takahashi et al. | |
| D308,656 S | 6/1990 | Takahashi et al. | |
| 4,930,697 A | 6/1990 | Takahashi et al. | |
| D310,645 S | 9/1990 | Julien | |
| 4,953,887 A | 9/1990 | Takahashi et al. | |
| 4,968,092 A | 11/1990 | Giambrone | |
| D317,280 S | 6/1991 | Takahashi et al. | |
| 5,028,061 A | 7/1991 | Hawkes | |
| D320,370 S | 10/1991 | Takahashi et al. | |
| 5,056,805 A | 10/1991 | Wang | |
| 5,074,575 A | 12/1991 | Bigo | |
| 5,087,066 A | 2/1992 | Mong-Hsing | |
| 5,110,150 A | 5/1992 | Chen | |
| 5,143,398 A | 9/1992 | Teng | |
| 5,181,735 A | 1/1993 | Onishi | |
| 5,184,835 A | 2/1993 | Huang | |
| 5,201,535 A * | 4/1993 | Kato et al. | 280/30 |
| 5,205,577 A | 4/1993 | Liu | |
| 5,205,579 A | 4/1993 | Kato et al. | |
| D337,257 S | 7/1993 | Danieli | |
| 5,238,292 A | 8/1993 | Golenz et al. | |
| 5,244,228 A | 9/1993 | Chiu | |
| 5,246,272 A | 9/1993 | Kato et al. | |
| 5,257,799 A | 11/1993 | Cone et al. | |
| D352,017 S | 11/1994 | Kaneko | |
| 5,362,089 A | 11/1994 | Jyan-Tsai | |
| 5,388,852 A | 2/1995 | Bigo et al. | |
| 5,398,951 A | 3/1995 | Ryu | |
| D357,439 S | 4/1995 | Haut et al. | |
| D357,440 S | 4/1995 | Pietra | |
| 5,417,449 A | 5/1995 | Shamie | |
| 5,417,450 A | 5/1995 | Wang | |
| 5,427,402 A | 6/1995 | Huang | |
| 5,431,478 A | 7/1995 | Noonan | |
| 5,437,493 A | 8/1995 | Weisleder | |
| 5,441,163 A | 8/1995 | Carrasco | |
| 5,454,584 A | 10/1995 | Haut et al. | |
| 5,460,395 A | 10/1995 | Chen | |
| 5,460,398 A | 10/1995 | Huang | |
| 5,472,224 A | 12/1995 | Cabagnero | |
| 5,478,102 A | 12/1995 | Haung | |
| 5,489,138 A | 2/1996 | Mariol et al. | |
| 5,511,259 A | 4/1996 | Tarara | |
| 5,511,441 A | 4/1996 | Arai | |
| 5,524,503 A | 6/1996 | Ishikura | |
| 5,527,090 A | 6/1996 | Cone, II | |
| 5,605,409 A | 2/1997 | Haut et al. | |
| 5,622,377 A | 4/1997 | Shamie | |
| 5,645,293 A | 7/1997 | Cheng | |
| 5,649,737 A | 7/1997 | Behnke | |
| 5,664,795 A | 9/1997 | Haung | |
| 5,669,623 A | 9/1997 | Onishi | |
| 5,669,624 A | 9/1997 | Eichhorn | |
| 5,669,625 A | 9/1997 | Cabagnero | |
| 5,676,386 A * | 10/1997 | Huang | 280/30 |
| 5,718,444 A | 2/1998 | Huang | |
| 5,722,682 A | 3/1998 | Wang | |
| 5,727,798 A | 3/1998 | Walters et al. | |
| 5,741,021 A | 4/1998 | Saint et al. | |
| 5,752,738 A | 5/1998 | Onishi et al. | |
| 5,765,855 A | 6/1998 | Chiu | |
| 5,765,856 A | 6/1998 | Kiser | |
| 5,769,447 A | 6/1998 | Huang | |
| 5,772,235 A | 6/1998 | Espenshade | |
| 5,775,718 A | 7/1998 | Huang | |
| 5,795,091 A | 8/1998 | Kakuda et al. | |
| 5,810,432 A | 9/1998 | Haut et al. | |
| 5,845,666 A | 12/1998 | Messner | |
| 5,845,924 A | 12/1998 | Huang | |
| 5,876,057 A | 3/1999 | Huang | |
| 5,887,935 A | 3/1999 | Sack | |
| D412,142 S | 7/1999 | Dickie | |
| 5,921,571 A | 7/1999 | Bell | |
| 5,934,757 A | 8/1999 | Smith | |
| 5,938,229 A | 8/1999 | Chen et al. | |
| 5,947,555 A * | 9/1999 | Welsh et al. | 297/130 |
| D415,075 S | 10/1999 | Lan | |
| 5,979,928 A | 11/1999 | Kuo | |
| 5,984,332 A | 11/1999 | Beaudoin et al. | |
| 5,988,669 A | 11/1999 | Freese et al. | |
| 5,988,670 A | 11/1999 | Song et al. | |
| D419,113 S | 1/2000 | Everett | |
| D421,940 S | 3/2000 | Gibson et al. | |
| 6,068,284 A | 5/2000 | Kakuda | |
| 6,070,890 A | 6/2000 | Haut et al. | |
| D427,822 S | 7/2000 | Greger | |
| 6,099,022 A | 8/2000 | Pring | |
| 6,102,431 A | 8/2000 | Sutherland et al. | |
| D431,212 S | 9/2000 | Haung | |
| D431,213 S | 9/2000 | Yang | |
| 6,116,624 A | 9/2000 | Hu | |
| 6,129,373 A | 10/2000 | Cheng | |
| 6,139,046 A | 10/2000 | Aalund et al. | |
| 6,152,476 A | 11/2000 | Huang | |
| 6,155,740 A | 12/2000 | Hartenstine | |
| 6,189,914 B1 | 2/2001 | Worth et al. | |
| 6,193,263 B1 | 2/2001 | Lin | |
| 6,209,829 B1 | 4/2001 | Yu | |
| 6,273,451 B1 | 8/2001 | Julien et al. | |
| 6,286,844 B1 | 9/2001 | Cone, II et al. | |
| 6,296,004 B1 | 10/2001 | Gordon | |
| 6,299,194 B1 | 10/2001 | Chen | |
| 6,302,613 B1 | 10/2001 | Lan | |
| D452,192 S | 12/2001 | Hartenstine et al. | |
| 6,339,862 B1 | 1/2002 | Cheng | |
| 6,368,006 B1 | 4/2002 | Yang et al. | |
| 6,398,233 B1 | 6/2002 | Liang et al. | |
| 6,409,205 B1 | 6/2002 | Bapst et al. | |
| 6,412,809 B1 | 7/2002 | Bigo et al. | |
| 6,442,261 B1 | 9/2002 | Gibson et al. | |
| 6,443,261 B1 | 9/2002 | Gibson et al. | |
| 6,443,479 B2 | 9/2002 | Huang | |
| 6,446,990 B1 * | 9/2002 | Nania et al. | 280/47.371 |
| 6,467,739 B1 | 10/2002 | Jou | |
| 6,478,327 B1 | 11/2002 | Hartenstine et al. | |
| D470,803 S | 2/2003 | Hansen | |
| D473,663 S | 4/2003 | Chou | |
| 6,557,871 B2 * | 5/2003 | Hsia | 280/47.38 |
| 6,557,885 B1 | 5/2003 | Kakuda | |
| 6,572,134 B2 | 6/2003 | Barrett et al. | |

| | | | | | | |
|---|---|---|---|---|---|---|
| 6,581,957 B1* | 6/2003 | Lan ............................. 280/642 | EP | 0 719 693 | 11/1995 | |
| D480,195 S | 9/2003 | Koerlin et al. | EP | 0 897 848 | 8/1998 | |
| 6,666,473 B2 | 12/2003 | Hartenstine et al. | EP | 0 901 953 | 3/1999 | |
| D494,511 S | 8/2004 | Chen | EP | 0 997 367 | 8/1999 | |
| 6,851,700 B2 | 2/2005 | Yoshie et al. | EP | 0 994 004 | 4/2000 | |
| 7,017,921 B2* | 3/2006 | Eros ........................ 280/47.38 | EP | 1 153 817 | 11/2001 | |
| 7,017,937 B2 | 3/2006 | Williams | EP | 1 170 193 | 1/2002 | |
| 7,032,922 B1* | 4/2006 | Lan ............................. 280/648 | EP | 1 160 145 | 12/2004 | |
| D521,422 S | 5/2006 | Williams | EP | 1 666 331 | 6/2006 | |
| 7,044,497 B2* | 5/2006 | Hartenstine et al. ........ 280/642 | EP | 1 591 339 | 12/2008 | |
| 7,185,909 B2 | 3/2007 | Espenshade et al. | ES | 2 016 525 | 8/1989 | |
| 7,188,858 B2 | 3/2007 | Hartenstine et al. | ES | 2 069 458 | 9/1992 | |
| D545,074 S | 6/2007 | Loew et al. | FR | 2 089 832 | 4/1971 | |
| 7,281,732 B2 | 10/2007 | Fox et al. | FR | 2 244 348 | 9/1973 | |
| D558,648 S | 1/2008 | Feyler et al. | FR | 2 267 918 | 4/1974 | |
| 7,338,122 B2 | 3/2008 | Hei et al. | FR | 2 257 482 | 1/1975 | |
| D566,629 S | 4/2008 | Taylor | FR | 2 323 563 | 9/1975 | |
| 7,445,229 B2 | 11/2008 | Dotsey et al. | FR | 2 667 512 | 10/1990 | |
| 7,445,230 B2* | 11/2008 | Kassai et al. ................ 280/644 | FR | 2 767 509 | 8/1998 | |
| D593,272 S | 5/2009 | Hailston | GB | 0 690 115 | 5/1950 | |
| D604,151 S | 11/2009 | Kollman et al. | GB | 1 175 516 | 7/1967 | |
| 7,621,431 B2 | 11/2009 | Williams | GB | 1 176 516 | 7/1967 | |
| 7,686,322 B2 | 3/2010 | Longenecker et al. | GB | 1 394 564 | 12/1973 | |
| D617,255 S | 6/2010 | Tezak et al. | GB | 1 510 312 | 9/1974 | |
| D630,934 S | 1/2011 | Kollman et al. | GB | 1 561 594 | 10/1976 | |
| 7,871,100 B2* | 1/2011 | Chen et al. ................... 280/642 | GB | 2 124 556 | 6/1982 | |
| D636,300 S | 4/2011 | Greger et al. | GB | 2 186 793 | 2/1987 | |
| 2005/0012306 A1* | 1/2005 | Lan ............................. 280/647 | GB | 2 197 784 | 6/1988 | |
| 2005/0242549 A1 | 11/2005 | Longenecker et al. | GB | 2 225 557 | 12/1988 | |
| 2006/0001226 A1 | 1/2006 | Refsum | GB | 2 244 029 | 3/1990 | |
| 2006/0131840 A1 | 6/2006 | Donay | GB | 2 268 394 | 5/1992 | |
| 2006/0131841 A1 | 6/2006 | Huang | GB | 2 251 830 | 7/1992 | |
| 2006/0152059 A1 | 7/2006 | Refsum | GB | 2 318 099 | 10/1996 | |
| 2006/0157945 A1 | 7/2006 | Refsum | GB | 2 324 510 | 3/1998 | |
| 2006/0219374 A1 | 10/2006 | McKinney | GB | 2 342 897 | 10/1999 | |
| 2006/0261576 A1 | 11/2006 | Dotsey et al. | IT | 1233953 | 1/1989 | |
| 2009/0127827 A1 | 5/2009 | Pike et al. | JP | 10-35506 | 2/1989 | |
| 2009/0127828 A1 | 5/2009 | Longenecker et al. | JP | 10-35506 | 2/1998 | |
| 2010/0038886 A1 | 2/2010 | Greger et al. | NL | 1009312 | 6/1998 | |
| 2010/0171289 A1 | 7/2010 | Greger et al. | PT | 84257 | 2/1987 | |
| | | | SU | 1156949 | 4/1983 | |
| | | | WO | 88/02714 | 4/1988 | |
| | | | WO | 93/07039 | 4/1993 | |
| | | | WO | 99/50123 | 10/1999 | |
| | | | WO | 00/06437 | 2/2000 | |
| | | | WO | 01/28840 | 4/2001 | |
| | | | WO | 2009/065129 | 5/2009 | |

FOREIGN PATENT DOCUMENTS

| | | |
|---|---|---|
| DE | 34 07 241 | 2/1984 |
| DE | 35 25 834 | 7/1985 |
| DE | 38 30 752 | 9/1988 |
| DE | 40 22 391 | 7/1990 |
| DE | 42 29 857 | 9/1992 |
| DE | 195 43 273 | 11/1995 |
| DE | 196 15 901 | 4/1996 |
| DE | 196 38 097 | 9/1996 |
| DE | 198 33 857 | 7/1997 |
| DE | 198 33 115 | 7/1998 |
| DE | 299 00 901 | 1/1999 |
| DE | 200 01 964 | 4/2000 |
| DE | 200 02 027 | 4/2000 |
| DE | 203 11 781 | 10/2003 |
| EP | 0 422 812 | 10/1990 |
| EP | 0 639 489 | 8/1994 |

OTHER PUBLICATIONS

Evenflo® Light & Easy™ Stroller (1999).
Evenflo® Easy Comfort Classic™ Travel System (1999).
Evenflo® Easy Comfort Plus™ Travel System (1999).
Evenflo® Easy Comfort Premier™ Travel System (1999).
Jane® Twin Two Stroller (printed May 5, 2010).
International Search Report and Written Opinion from International Application No. PCT/US2009/038746.

* cited by examiner

THREE DIMENSIONAL FOLDING STROLLER WITH INFANT CARRIER ATTACHMENT AND ONE HAND ACTUATED SEAT RECLINE

FIELD OF INVENTION

The present invention relates generally to child strollers. More particularly, the invention relates to a three-dimensional folding stroller having mounts for attachment of an infant carrier. Most particularly, the present invention relates to a stroller having movable mounts for an infant carrier that improves folding. The present invention also relates to a three-dimensional folding stroller having a one hand actuated reclining seatback support.

BACKGROUND

Three-dimensional folding strollers, also known as compound folding strollers, are well known in the art. The ability to fold in three-dimensions allows the stroller to achieve a more compact profile relative to known two-dimensional folding designs. Infant travel systems, which utilize a single infant carrier mountable between a car seat base and a stroller, are also well known in the art. An example of an infant travel system comprised of a stroller having mounts for attaching an infant carrier, such as an infant carseat carrier, can be found in U.S. Patent Publication Nos. 2005/0264062 and 2005/0242549. Strollers configured for use in travel systems utilize fixed mounts to secure the infant carrier to the stroller frame. The location of these fixed mounts on the stroller's frame is incompatible with a stroller having a three-dimensional folding design. Accordingly, there remains a need for a three-dimensional folding stroller useable in an infant travel system while retaining the ability to achieve the compact fold.

Foldable strollers having reclinable seatback supports are known in the art. However, there remains a need for a three-dimensional folding stroller having a reclinable seatback which can be operated with one hand while retaining an efficient, light-weight design.

SUMMARY

The present invention is directed to a three-dimensional folding stroller having mounts for an infant carrier. The mounts move between an operating position, when the infant carrier is engaged with the stroller, and a folding position, in which the mounts do not interfere with the stroller's ability to achieve a typical 3-D fold. The stroller's seat cover 42 is configured to ensure the mounts are properly positioned for the installation of the infant carrier 46, as well as to prevent the mounts from intruding into the infant seating area when the stroller is being used in a traditional fashion without the infant carrier 46.

Another aspect of the present invention is directed toward a foldable stroller having a reclinable seatback support which may be operated with one-hand. The reclining seatback support includes adjustment plates with a plurality of detents that define reclined positions for the seatback.

BRIEF DESCRIPTION OF THE DRAWINGS

The foregoing summary, as well as the following detailed description of the preferred embodiments of the invention, will be better understood when read in conjunction with the appended drawings. In the drawings.

DETAILED DESCRIPTION OF THE PREFERRED EMBODIMENT(S)

The invention will be described in detail with reference to FIGS. 1-10, wherein like numerals indicate like elements throughout. Throughout the description, "vertical" describes an orientation running from the bottom to the top of the stroller and "horizontal" describes an orientation running across the width of the stroller.

Figure 7:
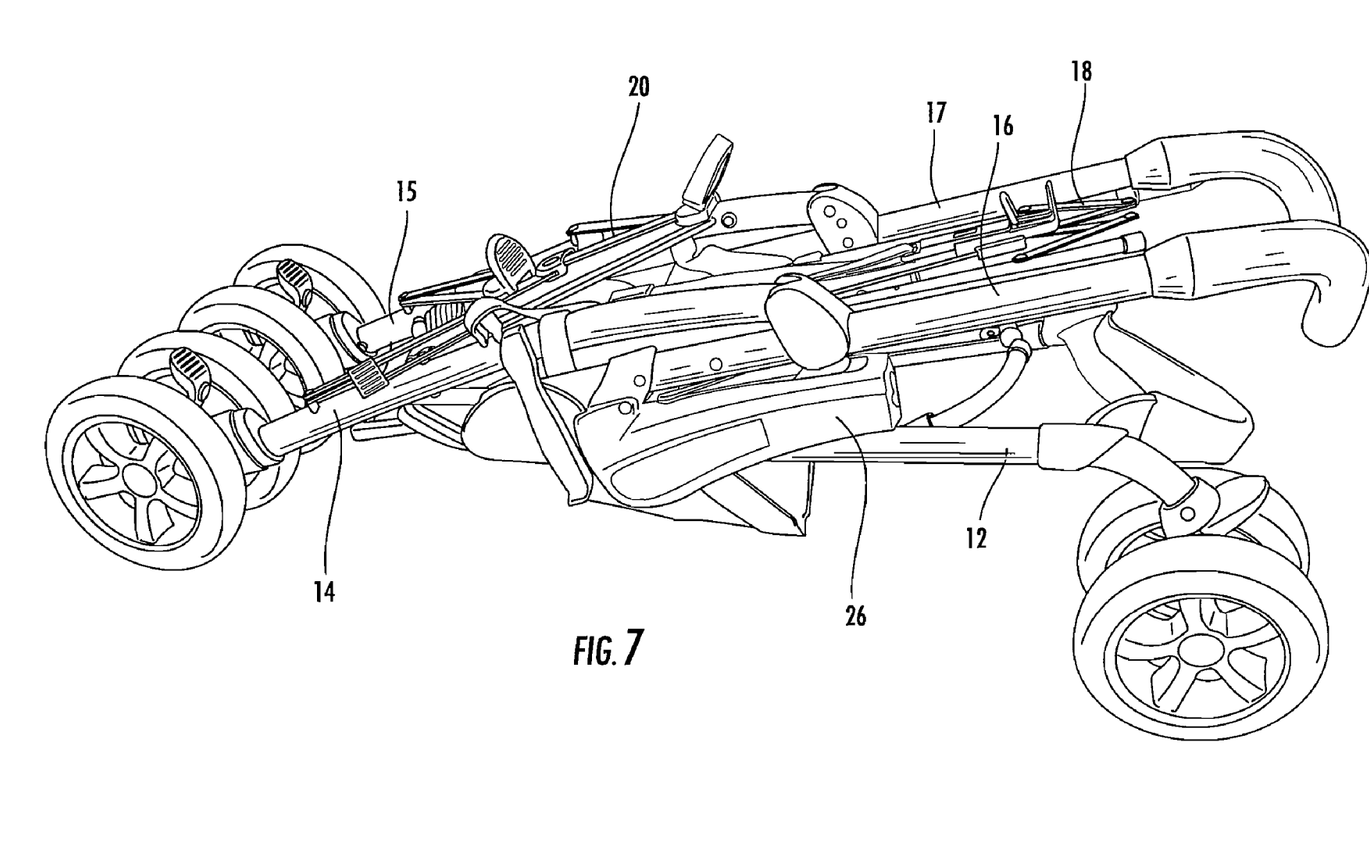
FIG. 7 illustrates the stroller frame of the present invention in the fully folded condition.
Figure 8:
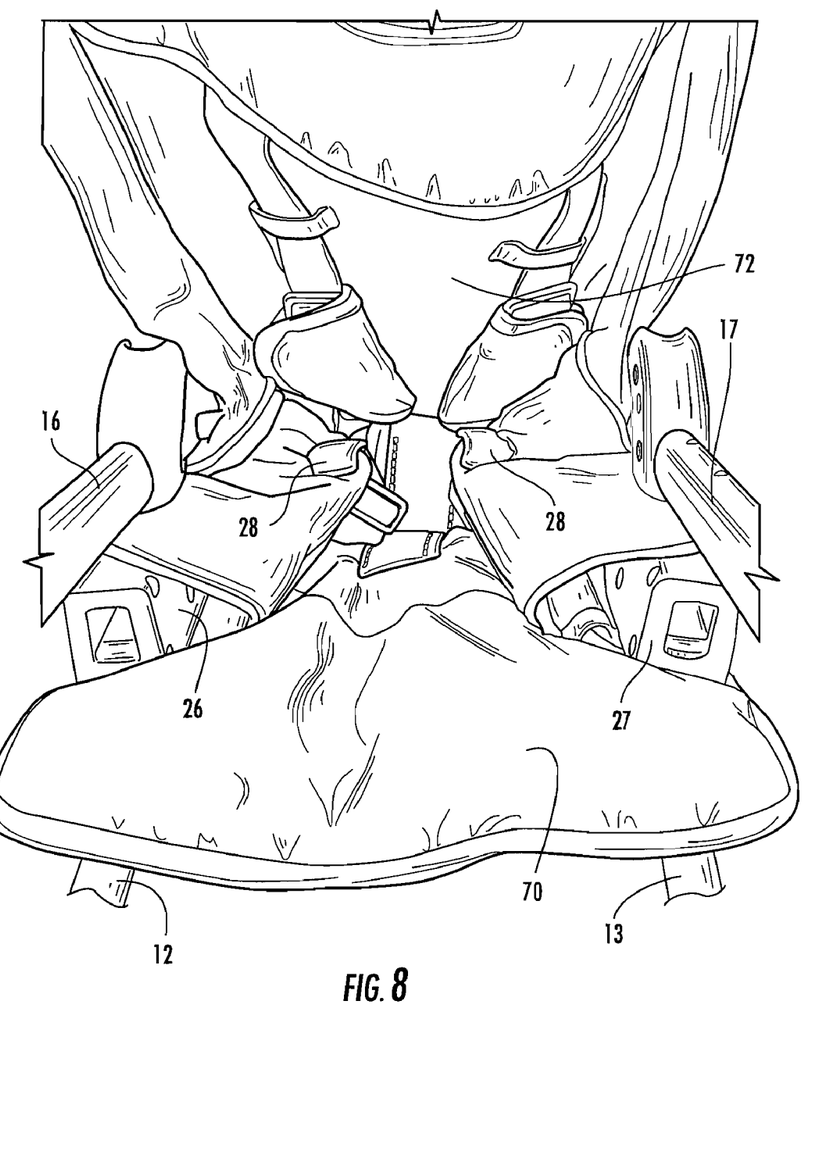
FIG. 8 is a view illustrating the position of the movable mounts and seat cover in the folded condition.

The three-dimensional folding stroller 10 of the present invention generally includes an articulated folding frame that converts between an open condition (FIGS. 1, 2, and 3), and a folded condition (FIGS. 7 and 8).

Figure 1:
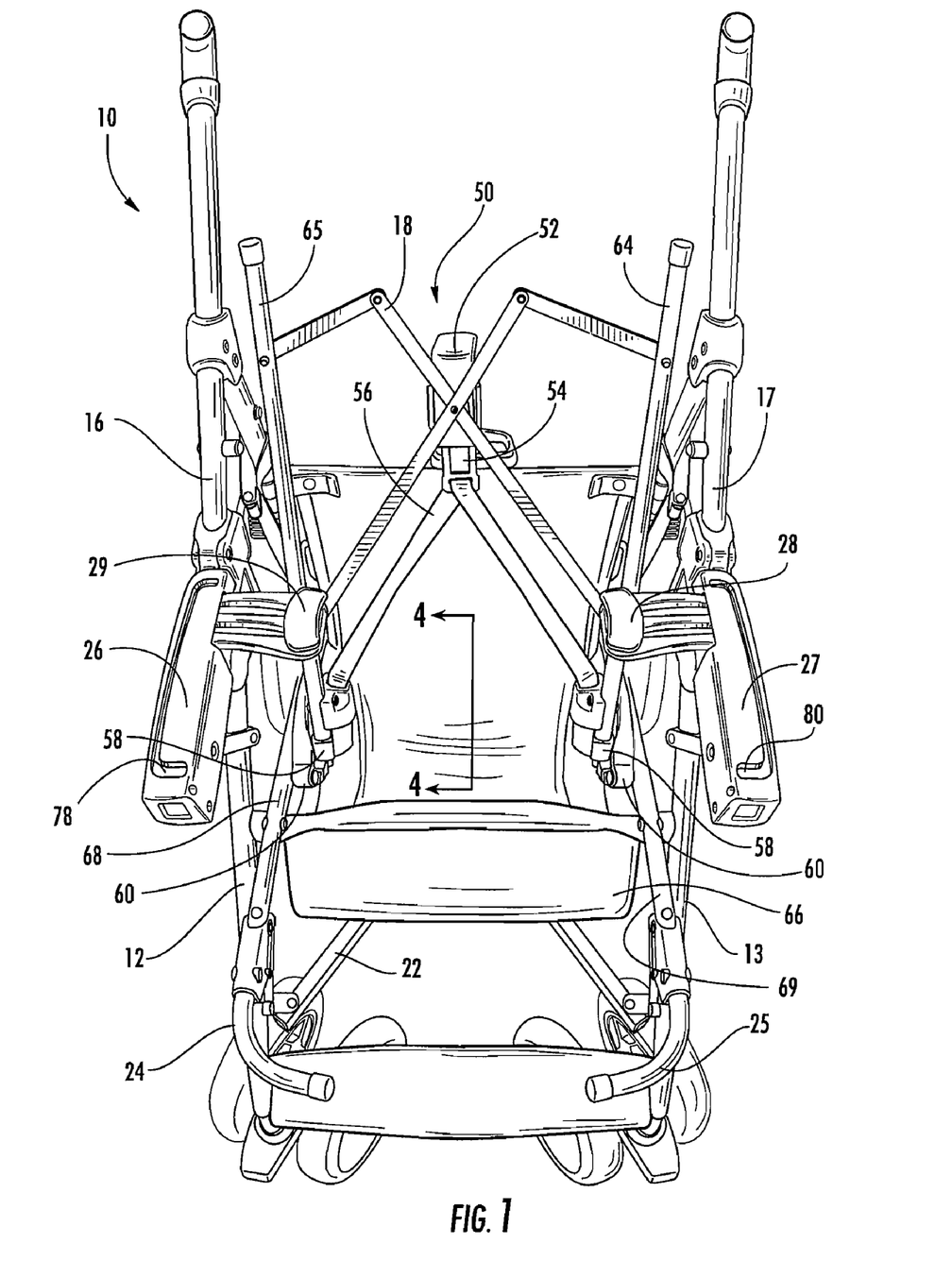
FIG. 1 illustrates the stroller frame of the present invention.

A preferred embodiment of the stroller with the infant carrier mounts shown in FIGS. 1-8 will now be described. Referring generally to FIG. 1, the stroller 10 comprises right and left front leg members 12, 13, right and left rear leg members 14, 15 (FIG. 6), right and left handle support rails 16, 17, right and left adjustable seat support members 24, 25, lower bracing 22, right and left lower frame members 68, 69, a reclining seatback support assembly 50, and right and left arms 26, 27.

Figure 2:
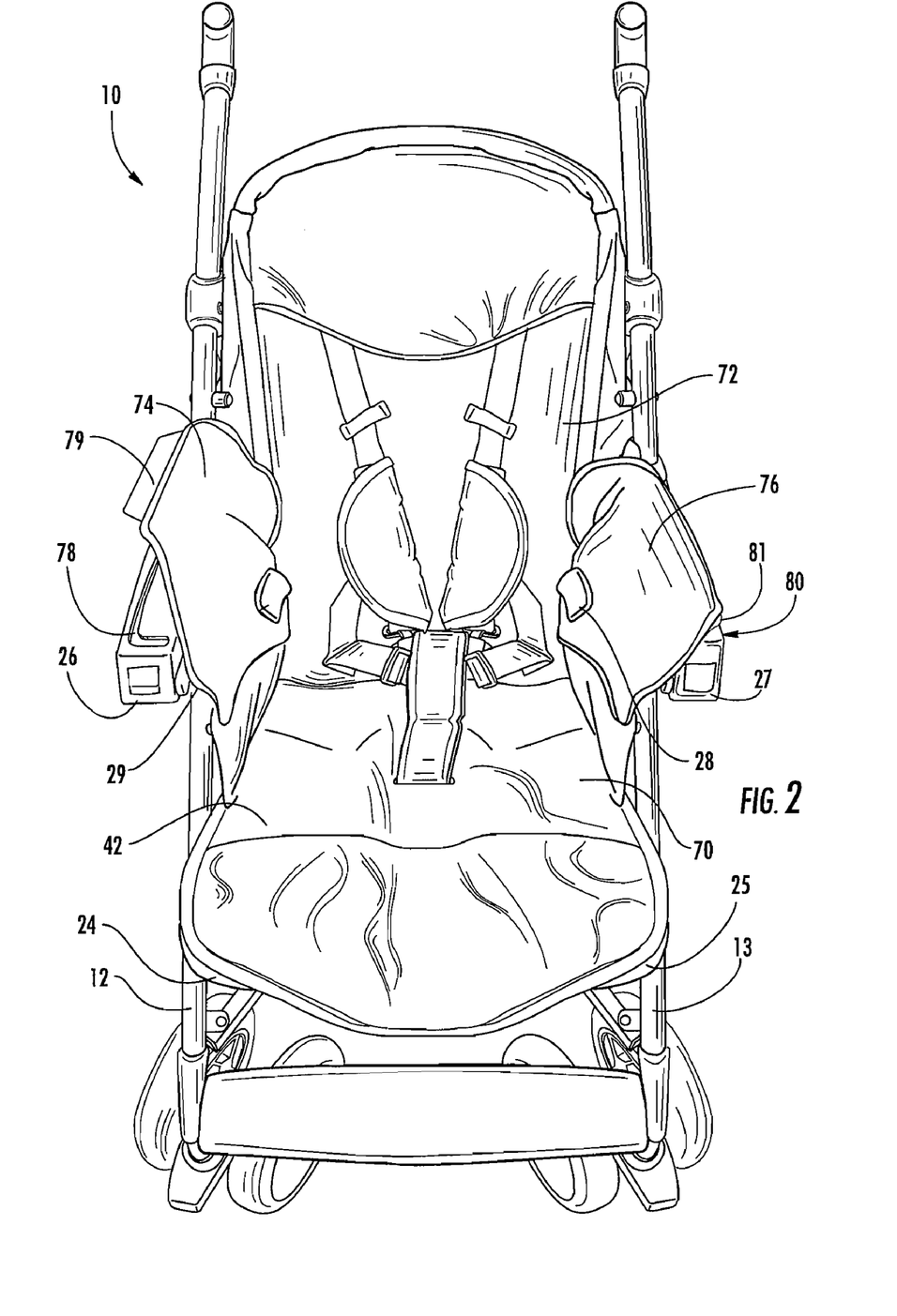
FIG. 2 shows the stroller frame of FIG. 1 with the seat cover installed.

Each of the arms 26, 27 has a respective infant carrier mount 28, 29 and a slot 78, 80 used to secure a seat cover, see FIG. 2. The infant carrier mounts 28, 29 capture and secure an infant carrier 46, see FIG. 3. With reference to FIGS. 1, 2 and 8, the infant carrier mounts 28, 29 are movable between an operating position (FIG. 2), and a folding position FIGS. 1 and 8.

Referring generally to FIG. 2, the foldable stroller is shown with a seat cover 42 installed over the frame 10. The cover 42 comprises a bottom portion 70, a back portion 72, and sides 74 and 76. The infant carrier mounts 28, 29 extend through a slot in the sides 74, 76 of the cover 42 to position them for contact with and to secure an infant carrier 46. As illustrated in FIG. 2, the cover 42 has stiffened ribbon portions 79, 81 that are inserted into the slots 78, 80 of the arms 26, 27 and secure the connection between the stroller arms 26, 27 and the cover 42. The remaining portions of the cover 42 are also secured to the stroller frame in a conventional fashion, such as by screws, buttons, clamps, or any other suitable fastening means. As a result of these connections, the cover 42 positions the seat mounts 28, 29 from a horizontal biased position shown in FIG. 1, toward a vertical position. This arrangement prevents the infant carrier mounts 28, 29 from intruding into the seating area when the infant carrier 46 is not in use, and orients the infant carrier mounts 28, 29 for attachment with the infant carrier 46.

Figure 3:
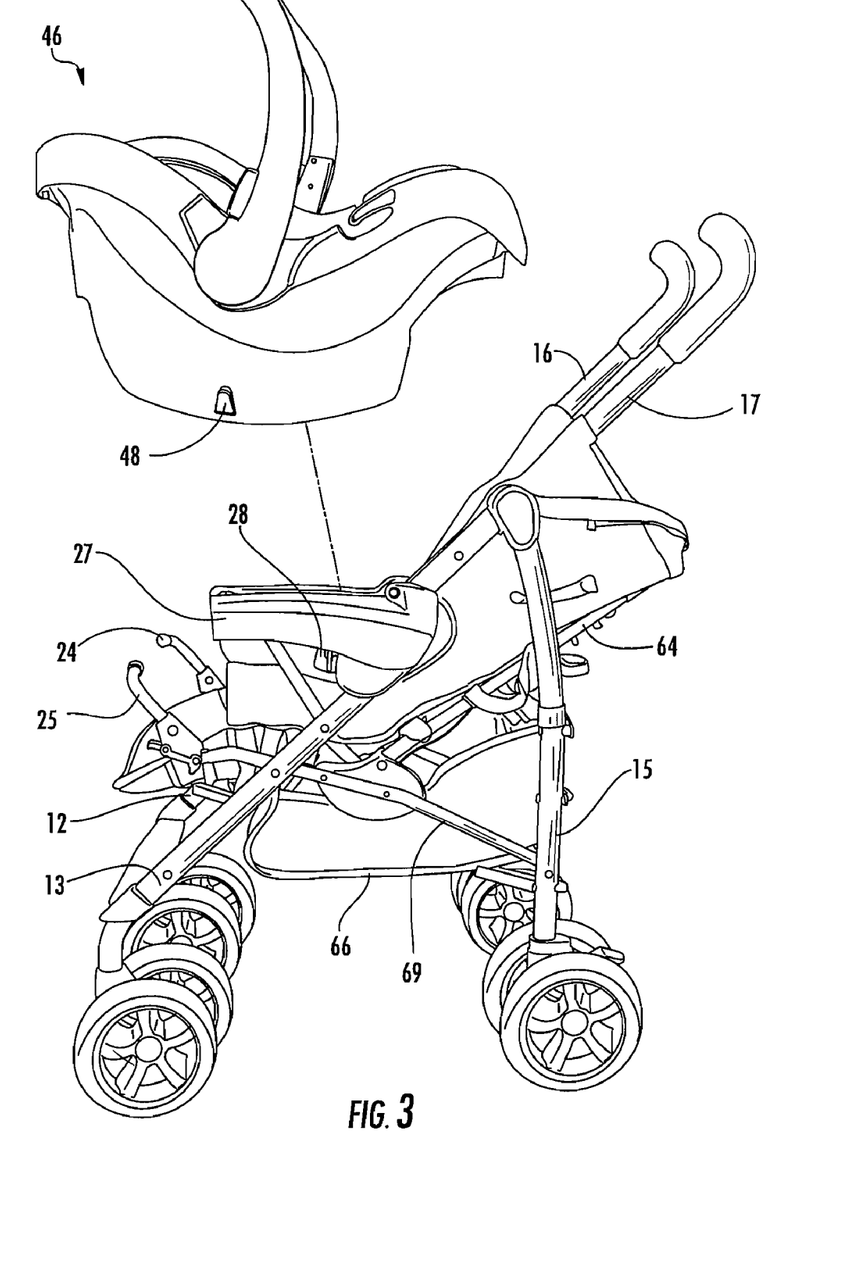
FIG. 3 is a side elevation illustrating the installation path for attaching an infant carrier to the stroller.

Referring generally to FIG. 3, an infant carrier 46, such as the infant car seat carrier described in U.S. Patent Publication No. 2005/0264062, includes some form of engaging projections 48. The projections 48 have a complimentary shape that engages with the infant carrier mounts 28, 29 when the seat 46 is inserted into the stroller in the manner illustrated. Once inserted, the infant carrier 46 fully displaces the infant carrier mounts 28, 29 into a substantially vertical position. A torsion spring 34 (FIG. 4) biases the infant carrier mounts 28, 29 toward the horizontal. In addition to providing improved contact with the locking projections 48 of the infant carrier 46, the bias provided by the spring 34 accommodates variations in the width of the infant carrier 46. This bias toward the horizontal is preferred as it improves the folding action.

Figure 4:
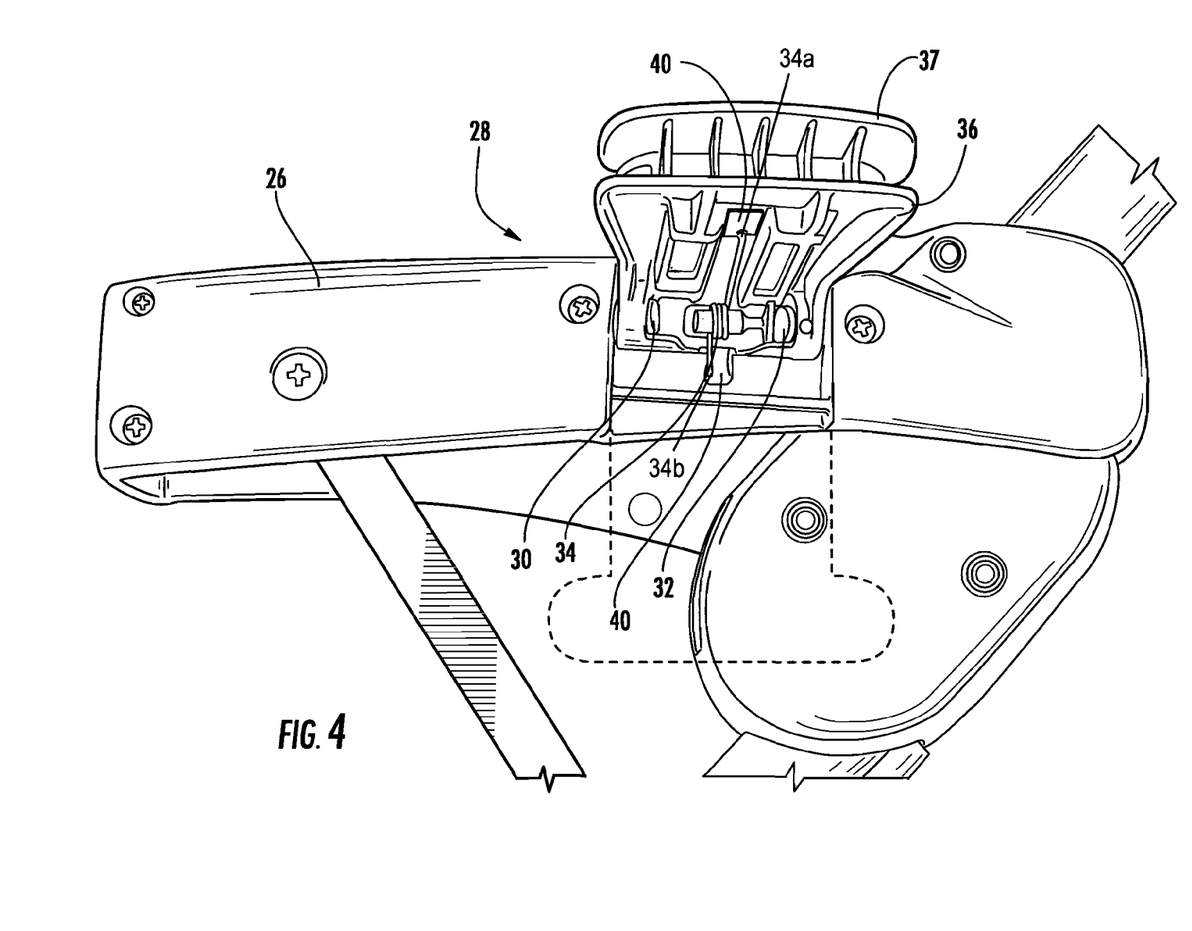
FIG. 4, a view taken alone line 4-4 in FIG. 1, shows the side view of the mount for the infant carrier.

Referring to FIG. 4, a side view of the arm 26 taken along line 4-4 in FIG. 1, the mount 28 is integrated into the stroller arm 26 and comprises a seat mount body 36 which is rotatably connected to two pins 30, 32. In the preferred embodiment, these pins 30, 32 are molded into the stroller arm 26, however, they may be secured to the arm 26 by any conventional means. The spring 34 is positioned between pins 30 and 32 with each of the free ends 34a, 34b positioned on a respective retaining surface 40. The seat mount body 36 has an engaging surface 37 of a complimentary shape to the projection 48 of the infant carrier 46 (FIG. 3). Installing the infant carrier 46 into the frame rotates the infant carrier mounts 28, 29 to a nearly vertical position, providing for the coupling between the engaging surfaces 37 of the infant carrier mounts 28, 29 and the locking projections 48 of the infant carrier 46. Once engaged, the springs 34 continually bias the infant carrier mounts 28, 29 against the infant carrier 46 to provide continuous contact with the projection 48 and secure the infant carrier 46 to the stroller.

In an alternate embodiment, the torsion spring 34 could be excluded from the assembly without departing from the scope of the invention. Further, it is envisioned that the infant carrier mounts 28, 29 could be attached to another suitable portion of the stroller frame so long as the mounts retain enough mobility to achieve the compact fold.

Figure 5:
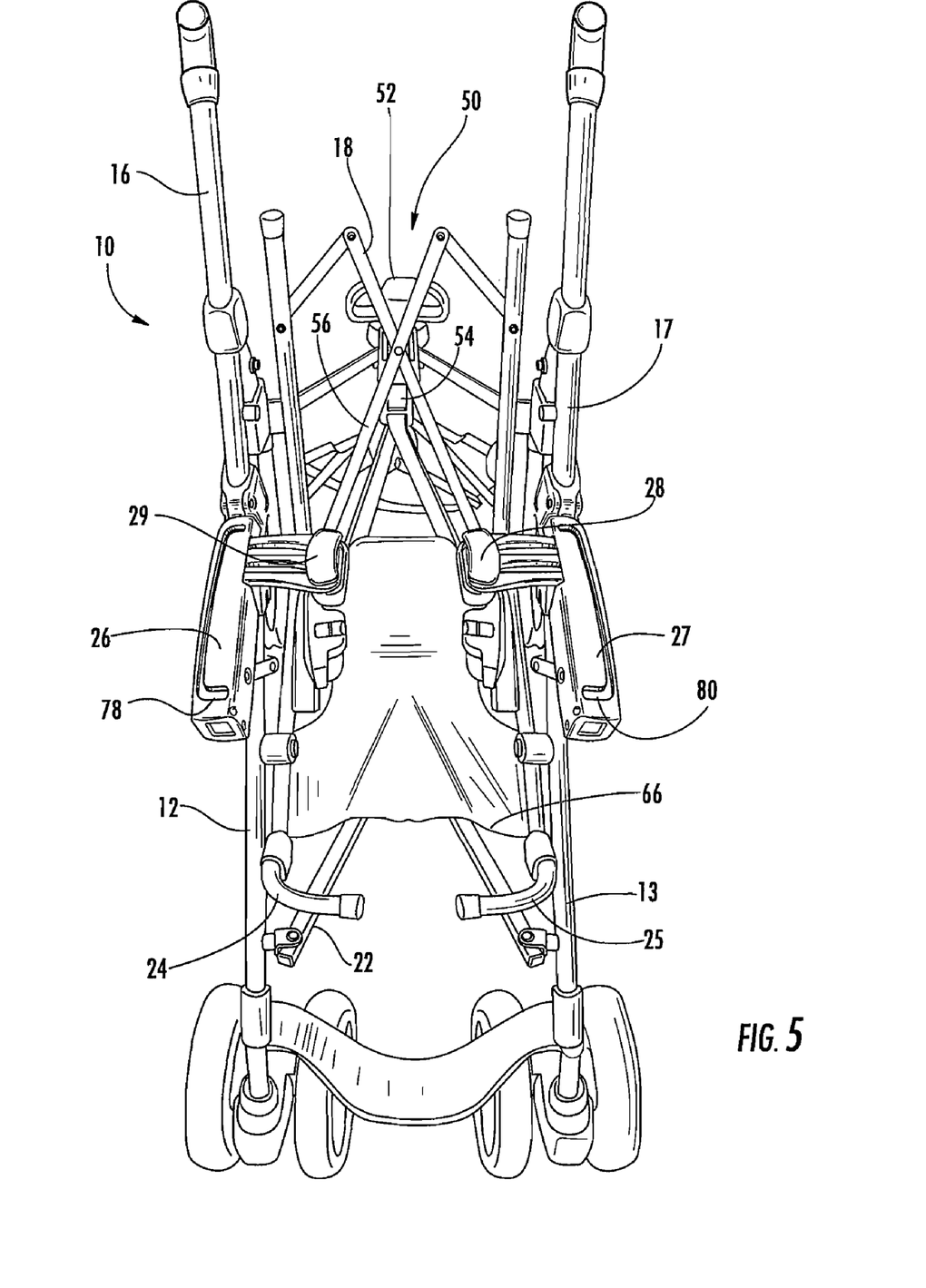
FIG. 5 illustrates the stroller frame of FIG. 1 in the partially folded condition.
Figure 6:
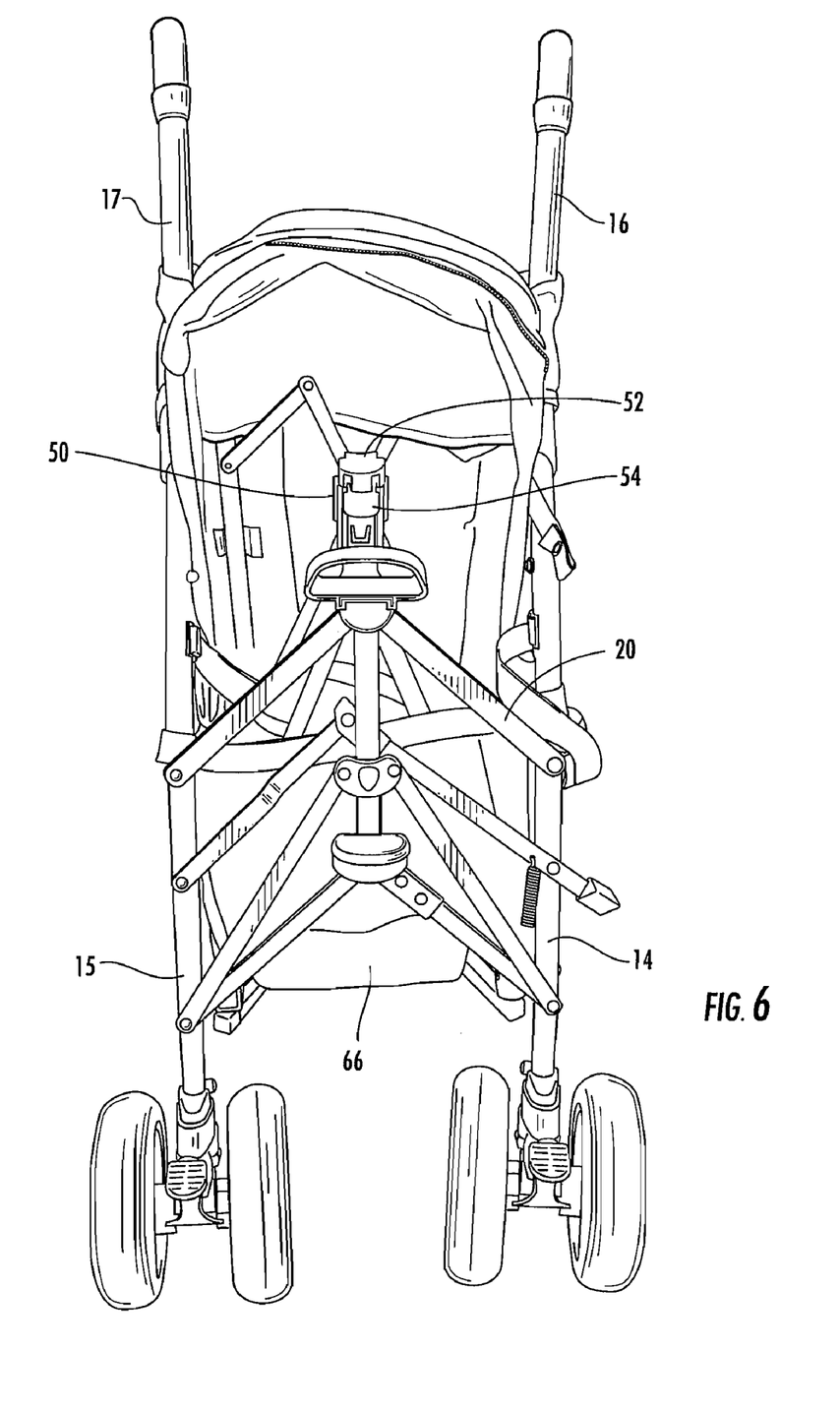
FIG. 6 is a rear view of the stroller frame of FIG. 5 with the seat cover installed.

Referring to FIGS. 5 and 6, the stroller of the present invention collapses in a fashion typical to three-dimensional folding strollers known in the art. Specifically, the lower bracing 22, rear bracing 20, and the reclining seatback frame 18 all collapse, resulting in the lower leg members 12, 13 and the handle support rails 16, 17 being pulled toward one another in the horizontal direction, reducing the overall width of the stroller 10. Finally, the leg members 12, 13 pivot toward an approximately parallel orientation with the handle support rails 16, 17. These two folding steps combine to create a compound fold which allows the stroller to be reduced to a profile much smaller than typical two-dimensional folding strollers.

FIG. 7 shows the stroller in its fully folded state. The stroller's right and left sides converge on one another as a result of the collapse of the rear bracing 20, the seatback frame 18, and the lower bracing 22 (not shown). The lower leg members 12, 13, pivot with respect to the handle supports 16, 17, bringing them into an approximately parallel orientation.

The need for the present invention is exemplified by examining the stroller in the folded configuration as shown in FIG. 8. When the stroller's frame is folded, the infant carrier mounts 28, 29 rotate into the folding position, or more nearly horizontal. This allows the infant carrier mounts 28, 29 to nest between the back seat portion 72 and the bottom seat portion 70. Had the infant carrier mounts 28, 29 been fixed in the operating position, the stroller frame would be inhibited from folding in the manner described above.

Another aspect of the present invention relating to a one-hand operated reclining seatback assembly 50 will now be described in detail. Generally referring to FIGS. 1, 9, and 10, the reclining seatback support assembly 50 features a seatback support frame 18, left and right seatback support frame rails 64, 65, a fixed handle guide 52, an operating handle 54, an activating strap 56, two projections 58, and two adjustment plates 60. The adjustment plates 60 are fixed to the lower frame members 68, 69 by fasteners 90 and feature a plurality of detents 62. The projections 58 feature engaging surfaces 59 and are biased by a spring, or other suitable means, toward engagement with one of the plurality of detents 62. The seatback support frame rails 64, 65 are pivotably mounted to the adjustment plates 60 by pins 92, allowing the seatback support assembly 50 to adjustably recline to a desired position.

Figure 9:
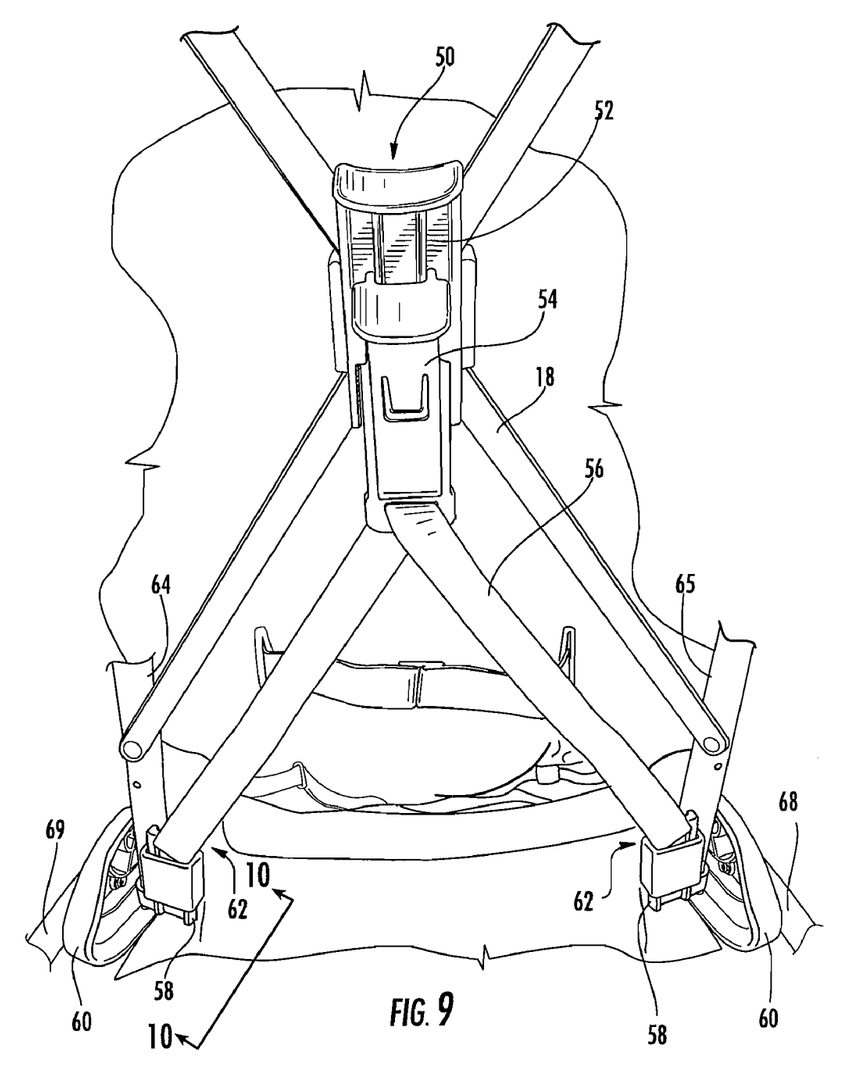
FIG. 9 is an elevation view of the reclining back support assembly of the present invention.
Figure 10:
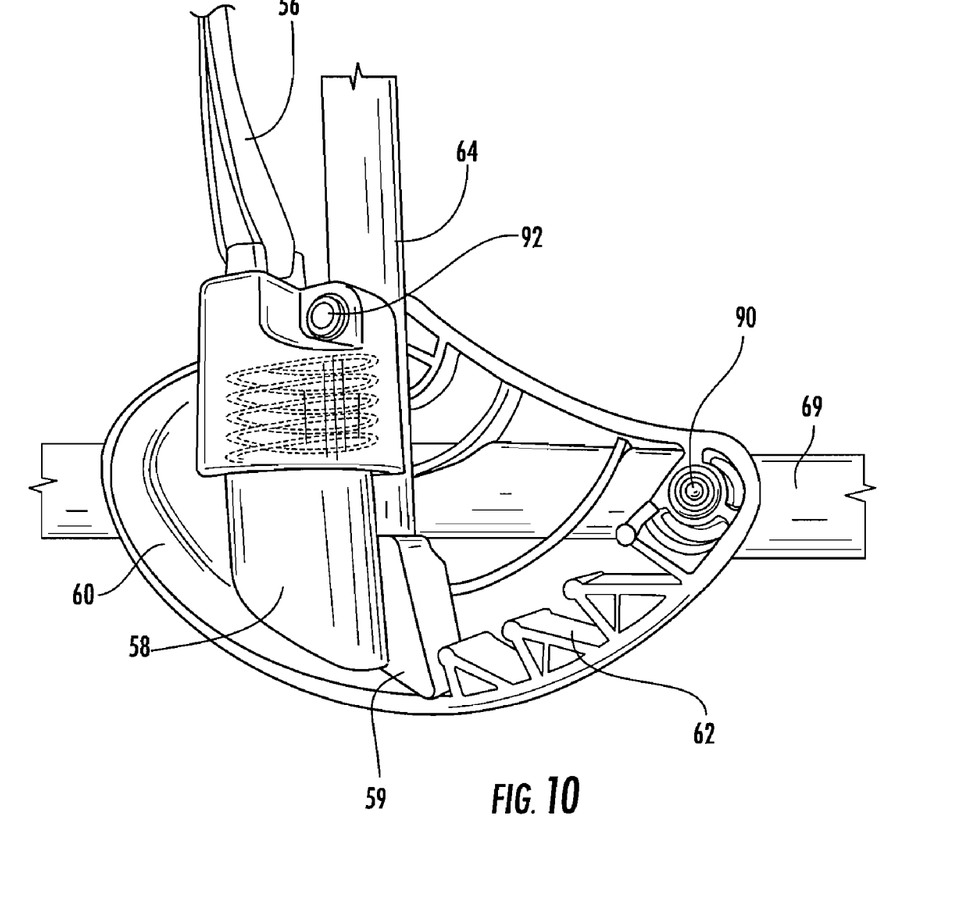
FIG. 10, a view taken along line 10-10 in FIG. 9, illustrates the adjustment mechanism for the one-hand reclining seatback support.

To recline the seatback, an operator can use one hand to apply an upward force on the operating handle 54 in a direction generally toward the top of the handle guide 52. The vertical movement of the handle 54 results in tensioning and upward movement of the activating strap 56. Referring to FIGS. 9 and 10, the activating strap 56 transfers the upward force to the projection 58, disengaging the engaging surface 59 from the detents 62 on the adjustment plate 60. Once disengaged, the back support frame rail 64 is free to rotate relative to the adjustment plate 60, which is fixed to the lower rail 69, allowing the entire seatback support assembly 50 to recline. The release of the operating handle 54 allows the projection 58 to reengage with the detents 62, setting the desired level of recline of the seatback support.

While various methods, configurations, and features of the present invention have been described above and shown in the drawings for the various embodiments of the present invention, those of ordinary skill in the art will appreciate from this disclosure that any combination of the above features can be used without departing from the scope of the present invention. Accordingly, it is recognized by those skilled in the art that changes may be made to the above described methods and embodiments of the invention without departing from the broad inventive concept thereof. It is understood, therefore, that this invention is not limited to the particular methods and embodiments disclosed, but is intended to cover all modifications which are within the spirit and scope of the invention as defined by the appended claims and/or shown in the attached drawings.

What is claimed is:

1. A foldable stroller comprising:
   an articulated frame that includes at least one front leg, at least one rear leg, and a seat support, the articulated frame defining a front, a rear, and right and left sides, the frame is foldable in a first direction such that the at least one front leg is displaceable toward the rear of the stroller and in a second direction such that right and left sides are convergable toward one another; and
   at least one infant carrier mount that is connected to the seat support and movable between a first position where the infant carrier mount is enageable to an infant carrier and a second position where the mount facilitates folding of the stroller, the at least one infant carrier mount is in the first position when the stroller is in a use configuration and is moveable to the second position relative to the frame as the stroller is folded.

2. The foldable stroller of claim 1, further comprising a seat cover that positions the at least one infant carrier mount.

3. The foldable stroller of claim 1, wherein the at least one infant carrier mount is shaped to be complementary to an engagement portion of the infant carrier.

4. The foldable stroller of claim 1 wherein the at least one infant carrier mount is biased toward the second position.

5. The foldable stroller of claim 4 wherein the at least one infant carrier mount is biased by a spring.

6. The foldable stroller of claim 1 wherein the seat support includes left and right armrests and the at least one infant carrier mount is connected to a selected one of the left and right armrests.

7. The foldable stroller of claim 1 wherein the seat support includes left and right armrests, and an infant carrier mount is connected to each of the left and right armrests.

8. The foldable stroller of claim 7 wherein the infant carrier mounts are rotatably connected to the respective armrest.

9. The foldable stroller of claim 1, comprising two infant carrier mounts.

10. The foldable stroller of claim 1, wherein the at least one infant carrier mount is moveable to the second position as the frame is folded in the second direction.

11. A stroller comprising:
    an articulated frame comprising at least one front leg, at least one rear leg, at least one lower frame member, and a reclinable seatback support;
    said at least one lower frame member having a first end directly attached to the at least one rear leg and a second end directly attached to the at least one front leg;
    an adjustment member fixed to the at least one lower frame member in between said first and second ends, the adjustment member defines a plurality of detents that correspond to selectable recline positions for the reclinable seatback support;
    a locking member movably attached to the reclinable seatback support that removably engages one of the plurality of detents; and
    an actuator handle connected to the locking member and movably mounted on a handle guide that is fixed to the seatback support, the actuator handle is slidable along the handle guide to a first position to move the locking member away from one of the plurality of detents and slidable along the handle guide to a second position to move the locking member into engagement with one of the plurality of detents.

12. The stroller of claim 11, wherein the locking member is biased toward the plurality of detents.

13. The stroller of claim 11, wherein there are two adjustment members and two locking members with at least one locking member biased toward the plurality of detents.

14. A foldable stroller comprising:
    a frame that includes at least one front leg, at least one rear leg, a seat support, and left and right armrests, the articulated frame defining a front, a rear, and right and left sides, the frame is foldable in a first direction such that the at least one front leg is displaceable toward the rear of the stroller and in a second direction such that right and left sides are convergable toward one another;
    a seat cover secured to the seat support and the left and right armrests, the seat cover having left and right slots adjacent a respective one of the left and right armrests; and
    left and right infant carrier mounts connected to the left and right armrests and extending through a respective one of the left and right slots; the left and right infant carrier mounts movable between a substantially vertical position where the infant carrier mounts are enageable to an infant carrier and a substantially horizontal position during folding of the stroller, the infant carrier mounts are in the substantially vertical position when the stroller is in a use configuration and are moveable to the substantially horizontal position relative to the frame as the stroller is folded.

* * * * *

(12) EX PARTE REEXAMINATION CERTIFICATE (10057th)
United States Patent
Longenecker et al.

(10) Number: US 8,100,429 C1
(45) Certificate Issued: Feb. 26, 2014

(54) THREE DIMENSIONAL FOLDING STROLLER WITH INFANT CARRIER ATTACHMENT AND ONE HAND ACTUATED SEAT RECLINE

(75) Inventors: Michael L. Longenecker, Lancaster, PA (US); Jeff G. Greger, Lititz, PA (US)

(73) Assignee: Artsana USA, Inc., Lancaster, PA (US)

Reexamination Request:
No. 90/020,055, May 16, 2013

Reexamination Certificate for:
Patent No.: 8,100,429
Issued: Jan. 24, 2012
Appl. No.: 12/059,591
Filed: Mar. 31, 2008

(51) Int. Cl.
*B62D 3/02* (2006.01)
*B62D 7/00* (2006.01)
*B62D 9/00* (2006.01)

(52) U.S. Cl.
USPC ........... 280/642; 280/646; 280/647; 280/650; 280/658

(58) Field of Classification Search
None
See application file for complete search history.

(56) References Cited

To view the complete listing of prior art documents cited during the proceeding for Reexamination Control Number 90/020,055, please refer to the USPTO's public Patent Application Information Retrieval (PAIR) system under the Display References tab.

*Primary Examiner* — Russell Stormer (57) ABSTRACT

A three-dimensional folding stroller featuring movable infant carrier mounts for securing an infant carrier to the stroller. The infant carrier mounts move between a first position, where the infant carrier may be secured to the stroller, and a second position that facilitates folding. The stroller also features a reclinable seatback support that is operable by one hand.

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 11 is determined to be patentable as amended.

Claims 12 and 13, dependent on an amended claim, are determined to be patentable.

New claims 15 and 16 are added and determined to be patentable.

Claims 1-10 and 14 were not reexamined.

11. A stroller comprising:
an articulated frame comprising at least one front leg, at least one rear leg, at least one lower frame member, and a reclinable seatback support *assembly comprising left and right seatback support rails each having an upper end and a lower terminal end defining an elongated length of rail*;
said at least one lower frame member having a first end directly attached to the at least one rear leg and a second end directly attached to the at least one front leg;
an adjustment member fixed to the at least one lower frame member in between said first and second ends, the adjustment member defines a plurality of detents that correspond to selectable recline positions for the reclinable seatback support *assembly*;
a locking member movably attached to *the lower terminal end of at least one of* the [reclinable] seatback support *rails* that removably engages one of the plurality of detents, *the locking member having an extended position in which the locking member extends in a direction of the elongated length of rail past the lower terminal end of the seatback support rail to engage one of the plurality of detents and a retracted position in which the locking member is drawn in the direction of the elongated length of rail toward the lower terminal end of the seatback support rail*; and
an actuator handle connected to the locking member and movably mounted on a handle guide that is fixed to the seatback support, the actuator handle is slidable along the handle guide to a first position to move the locking member away from one of the plurality of detents *into the retracted position* and slidable along the handle guide to a second position to move the locking member into [engagement with] *the extended position to engage* one of the plurality of detents.

15. *A stroller comprising:*
*an articulated frame comprising at least one front leg, at least one rear leg, at least one lower frame member, and a reclinable seatback support assembly comprising elongated left and right frame members having an upper terminal end and a lower terminal end:*
*the at least one lower frame member having a first end directly attached to the at least one rear leg and a second end directly attached to the at least one front leg;*
*an adjustment member fixed to the at least one lower frame member between the first and second ends of the lower frame member, the adjustment member defines a plurality of detents that correspond to selectable recline positions for the reclinable seatback support assembly;*
*a locking member movably attached to the lower end of at least one of the elongated left and right frame members that removably engages one of the plurality of detents, the locking member having an extended position that extends past the lower terminal end of the at least one of the elongated left and right frame members to engage a selected detent; and*
*an actuator handle connected to the locking member and movably mounted on a handle guide that is fixed to the seatback support, the actuator handle is slidable along the handle guide to a first position to move the locking member away from one of the plurality of detents into a retracted position and slidable along the handle guide to a second position to move the locking member into the extended position to engage the selected detent.*

16. *A stroller comprising:*
*an articulated frame comprising at least one front leg, at least one rear leg, at least one lower frame member, and a reclinable seatback support;*
*the at least one lower frame member having a first end directly attached to the at least one rear leg and a second end directly attached to the at least one front leg;*
*an adjustment member fixed to the at least one lower frame member in between the first and second ends, the adjustment member defines a plurality of detents that correspond to selectable recline positions for the reclinable seatback support;*
*the reclinable seatback support is pivotally attached to the adjustment member at a pivot point above the plurality of detents;*
*a locking member movably attached to the reclinable seatback support that removably engages one of the plurality of detents below the pivot point; and*
*an actuator handle connected to the locking member and movably mounted on a handle guide that is fixed to the seatback support, the actuator handle is slidable along the handle guide to a first position to move the locking member away from one of the plurality of detents and slidable along the handle guide to a second position to move the locking member into engagement with one of the plurality of detents.*

\* \* \* \* \*